(12) United States Patent
Martens

(10) Patent No.: US 11,027,823 B2
(45) Date of Patent: Jun. 8, 2021

(54) HOLDING DEVICE FOR AN AIRCRAFT ACTUATOR

(71) Applicant: Airbus Operations GmbH, Hamburg (DE)

(72) Inventor: Marko Martens, Osterholz-Scharmbeck (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 322 days.

(21) Appl. No.: 16/025,415

(22) Filed: Jul. 2, 2018

(65) Prior Publication Data

US 2019/0009888 A1    Jan. 10, 2019

(30) Foreign Application Priority Data

Jul. 4, 2017    (GB) ...................................... 1710722

(51) Int. Cl.
  *B64C 13/30* (2006.01)
  *F15B 15/26* (2006.01)
  *B64C 13/40* (2006.01)

(52) U.S. Cl.
  CPC .............. *B64C 13/30* (2013.01); *F15B 15/26* (2013.01); *B64C 13/40* (2013.01)

(58) Field of Classification Search
  CPC .......... B64C 13/30; B64C 13/40; F15B 15/26
  See application file for complete search history.

(56) References Cited

U.S. PATENT DOCUMENTS

| 4,596,177 A  * | 6/1986 | Biafore ................... B64C 13/40 91/35 |
| 4,786,202 A  * | 11/1988 | Arnold ................... F16C 11/045 403/11 |
| 4,808,023 A  * | 2/1989 | Arnold ................... F16C 11/045 403/157 |
| 2010/0327111 A1* | 12/2010 | Sanderson ............. B64D 15/12 244/99.3 |
| 2016/0311523 A1 | 10/2016 | Li et al. |

FOREIGN PATENT DOCUMENTS

EP    3085618    10/2016

OTHER PUBLICATIONS

GB Search Report, dated Dec. 14, 2017 priority document.

* cited by examiner

*Primary Examiner* — Philip J Bonzell
*Assistant Examiner* — Tye William Abell
(74) *Attorney, Agent, or Firm* — Greer, Burns & Crain, Ltd.

(57) ABSTRACT

A holding device for an aircraft actuator, comprising a body that extends between a lug configured to hingedly connect the holding device to a actuator support body and an attachment flange configured to fixedly attach the holding device to a landing provided by a main body of an actuator. The holding device is configured to prevent movement of the actuator from a normal working position relative to the actuator support body in the event of structural failure of a connection body of the actuator.

14 Claims, 6 Drawing Sheets

HOLDING DEVICE FOR AN AIRCRAFT ACTUATOR

CROSS-REFERENCES TO RELATED APPLICATIONS

This application claims the benefit of the Great Britain patent application No. 1710722.8 filed on Jul. 4, 2017, the entire disclosures of which are incorporated herein by way of reference.

FIELD OF TECHNOLOGY

The present invention relates to a holding device for an aircraft actuator, an aircraft actuator and an aircraft actuator assembly.

BACKGROUND OF THE INVENTION

In an aircraft, numerous moveable structures are used to achieve respective functions. In reference to FIG. 1A, moveable structures 103 on an aircraft wing such as flaps, slats, spoilers and ailerons are used aerodynamically to control the magnitude and distribution of lift and drag forces that determine the aircraft's flightpath. Moveable structures 103 are typically actuated by one or more actuators 105 which are hingedly attached at one end by a connection body 107 to a fixed actuator support body 109 and at the other end by a rod end 111 to the movable structure 103. During normal operation, the extension and retraction of the actuator 105 determines the position of the moveable structure 103 relative to the fixed actuator support body 109. The exact extent of the actuator's extension and retraction are set within a predefined envelope of normal working positions 113 and 113' respectively, as seen in FIG. 1A. Seeing as the mechanism is composed of multiple moving parts, it is possible, however unlikely, for a structural failure event to occur.

FIG. 1B shows a failure event for the actuator 105 of FIG. 1A whereby the connection body 107 of the actuator 105 has structurally failed at position 121, thus allowing the actuator 105 to become detached from the actuator support body 109. Alternatively, the connection body 107 may fail at the hinged connection position 123. With the moveable structure 103 still subject to aerodynamic loads it may extend outwards beyond its own envelope of normal working position to a failed position 113". As the actuator 105 is still attached at one end to a moveable structure 103, it may move away from the normal working position of the actuator 105, e.g., forwards, aftwards, or downwards depending on the inertial or aerodynamic loads acting on the movable structure 103, to which the actuator 105 is attached. The actuator 105 may therefore contact the underlying structure 115 beneath it, potentially causing damage to the main body of the actuator 117 and to the underlying structure itself. Furthermore, one of more system elements 119 connected to the actuator 105 may be subjected to stresses due to the actuator 105 being moved further aft than the design of the system element 119 permits, which may cause further damage to the system and, in any event, may increase the number of inspections required to be carried out when the aircraft 101 is on the ground after such an event. In view of the above, it can be considered an object of the present invention to provide an improved actuator assembly.

Here, it is to be noted that, the technical content provided in this section is intended to assist the understanding of the present invention by those skilled in the art, and do not necessarily constitute the prior art.

SUMMARY OF THE INVENTION

An embodiment of the present invention provides an aircraft actuator assembly, comprising a holding device comprising a body that extends between an attachment flange and a lug, wherein the attachment flange is configured to be fixedly attached to a corresponding landing provided by a main body of an actuator and the lug is configured to be hingedly connected to an actuator support body; an actuator comprising the main body and a connection body, wherein the main body is provided with the corresponding landing configured to receive the attachment flange of the holding device and the connection body is provided with a further lug configured to hingedly connect the actuator to the actuator support body; wherein the holding device prevents movement of the actuator from a normal working position relative to the actuator support body in the event of structural failure of the connection body.

A further embodiment of the present invention provides an aircraft actuator assembly wherein the actuator support body forms a clevis configured to receive the lug of the holding device and the further lug of the connection body.

Another embodiment of the present invention provides an aircraft actuator assembly comprising more than one holding device.

A further embodiment of the present invention provides an aircraft actuator assembly, comprising a pair of holding devices, each holding device positioned at opposing sides of the connection body.

Another embodiment of the present invention provides an aircraft actuator assembly, wherein the attachment flange and corresponding landing form a lap joint when fixedly attached to one another by a shear type fastener.

A further embodiment of the present invention provides an aircraft actuator comprising
a main body and a connection body, wherein the main body is provided with a landing configured to receive an attachment flange of a holding device and the connection body is provided with a lug configured to hingedly connect the actuator to an actuator support body.

Another embodiment of the present invention provides an aircraft actuator comprising more than one landing, each landing configured to receive a corresponding attachment flange of a holding device.

A further embodiment of the present invention provides an aircraft actuator, wherein the connection body further comprises a spigot configured to engage a corresponding receiving hole formed by a body of a holding device.

Another embodiment of the present invention provides a holding device for an aircraft actuator, comprising a body that extends between a lug configured to hingedly connect the holding device to a actuator support body and an attachment flange configured to fixedly attach the holding device to a landing provided by a main body of an actuator; wherein the holding device is configured to prevent movement of the actuator from a normal working position relative to the actuator support body in the event of structural failure of a connection body of the actuator.

A further embodiment of the present invention provides a holding device wherein the lug is configured to be received within a clevis formed by an actuator support body.

Another embodiment of the present invention provides a holding device comprising a unitary body formed from aviation grade titanium alloy.

A further embodiment of the present invention provides a holding device a wherein the attachment flange extends substantially perpendicular from the body of the holding device.

Another embodiment of the present invention provides a holding device, wherein the body further comprises a receiving portion configured to receive a corresponding spigot formed by a connection body of an actuator.

A further embodiment of the present invention provides a holding device wherein the lug is configured to have an inner diameter offset between 0.5 mm and 3 mm from an adjacent attachment element.

Another embodiment of the present invention provides a kit of parts comprising an actuator and a holding device.

Advantages of the present invention will now become apparent from the detailed description with appropriate reference to the accompanying drawings.

BRIEF DESCRIPTION OF THE DRAWINGS

Embodiments of the invention will now be described, by way of example only, with reference to the following figures in which.

DETAILED DESCRIPTION OF THE PREFERRED EMBODIMENTS

Figure 2:
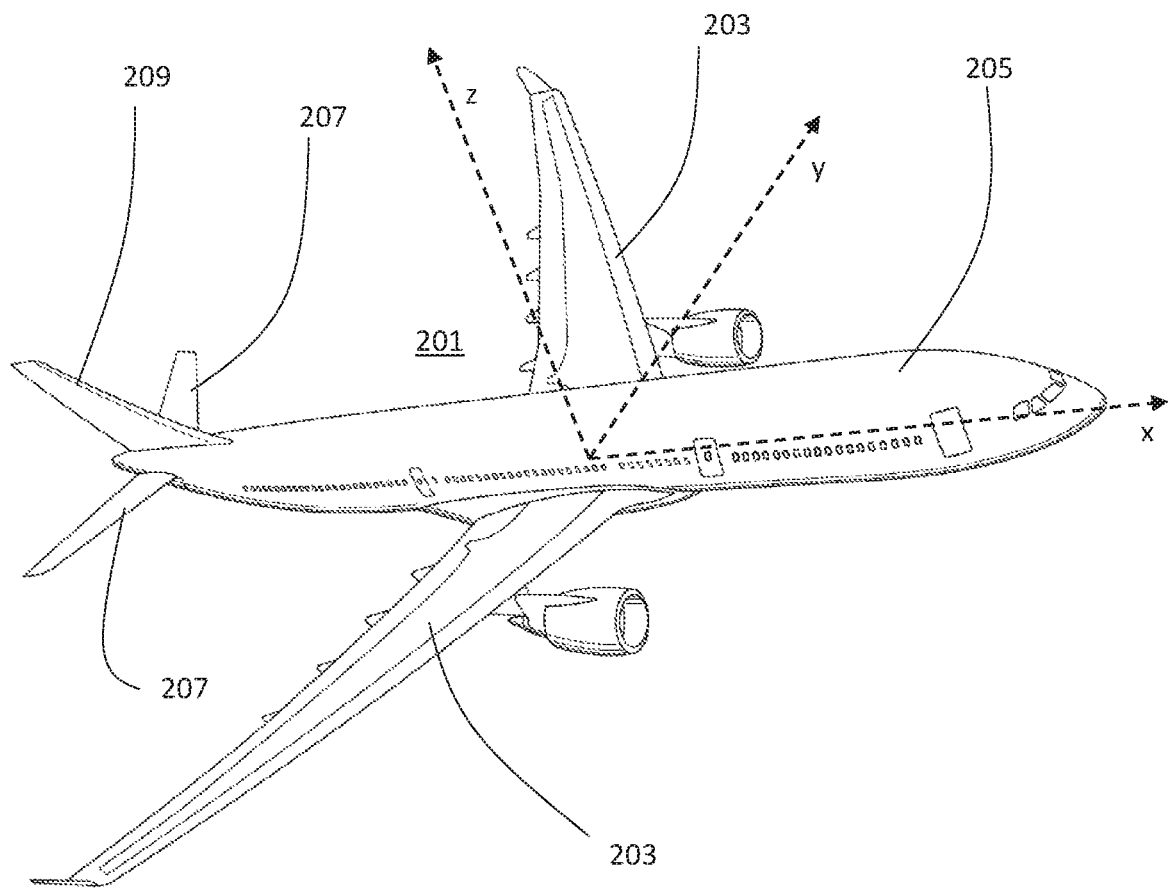
FIG. 2 is a schematic perspective view of an aircraft embodying the present invention.

With reference to FIG. 2, an aircraft 201 has a wing 203 that extends approximately horizontally through a fuselage 205. A pair of horizontal tail planes 207 extends approximately horizontally from either side of a rear portion of the fuselage 205. A vertical tail plane 209 extends vertically from an upper rear portion of the fuselage 205.

The aircraft 201 has a set of orthogonal aircraft axes. The longitudinal axis (x) has its origin at the center of gravity of the aircraft 201 and extends lengthwise in a positive sense through the fuselage 205 from the nose to the tail in the normal direction of flight. The lateral axis or spanwise axis (y) also has its origin at the center of gravity and extends substantially crosswise in a positive sense from the right-hand tip to the left-hand tip of the wing 203. The vertical or normal axis (z) also has its origin at the center of gravity and passes vertically through the center of gravity of the aircraft 201 in a positive sense as indicated also. A set of aircraft reference planes are also formed by the orthogonal aircraft axes; x-y, x-z and y-z.

Figure 1A:
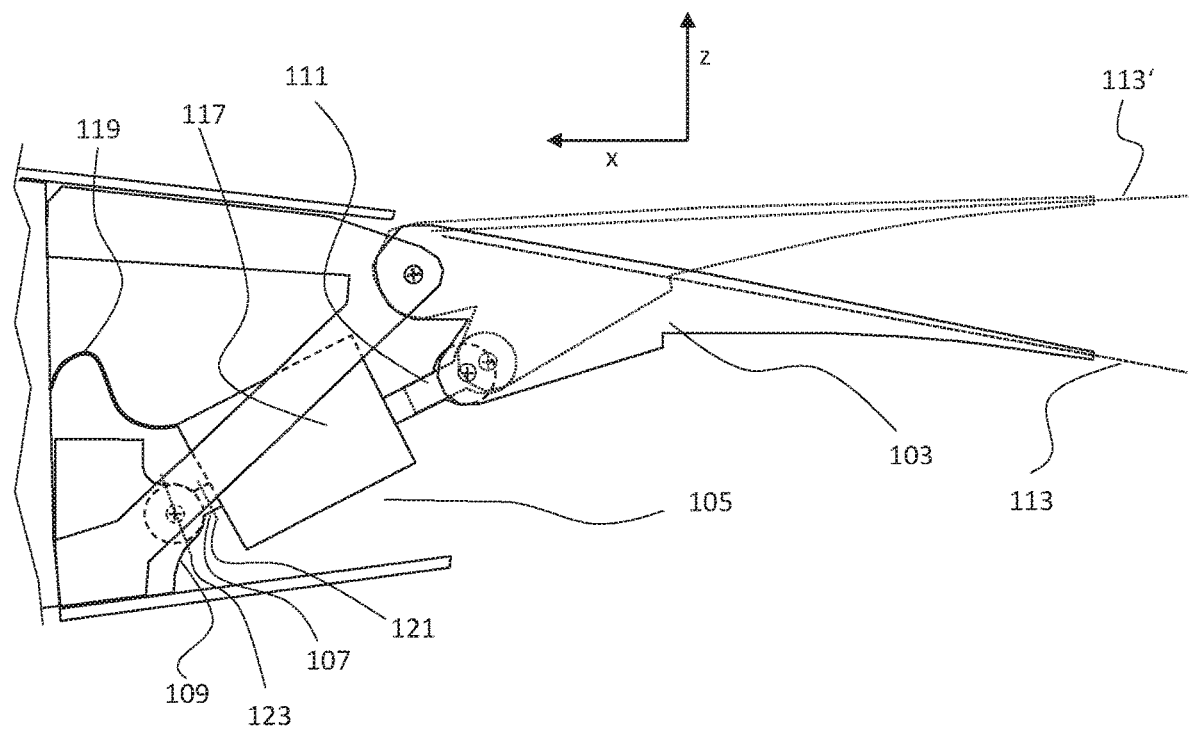
FIGS. 1A and 1B are schematic side views of an actuator assembly failure case in the prior art.
Figure 3:
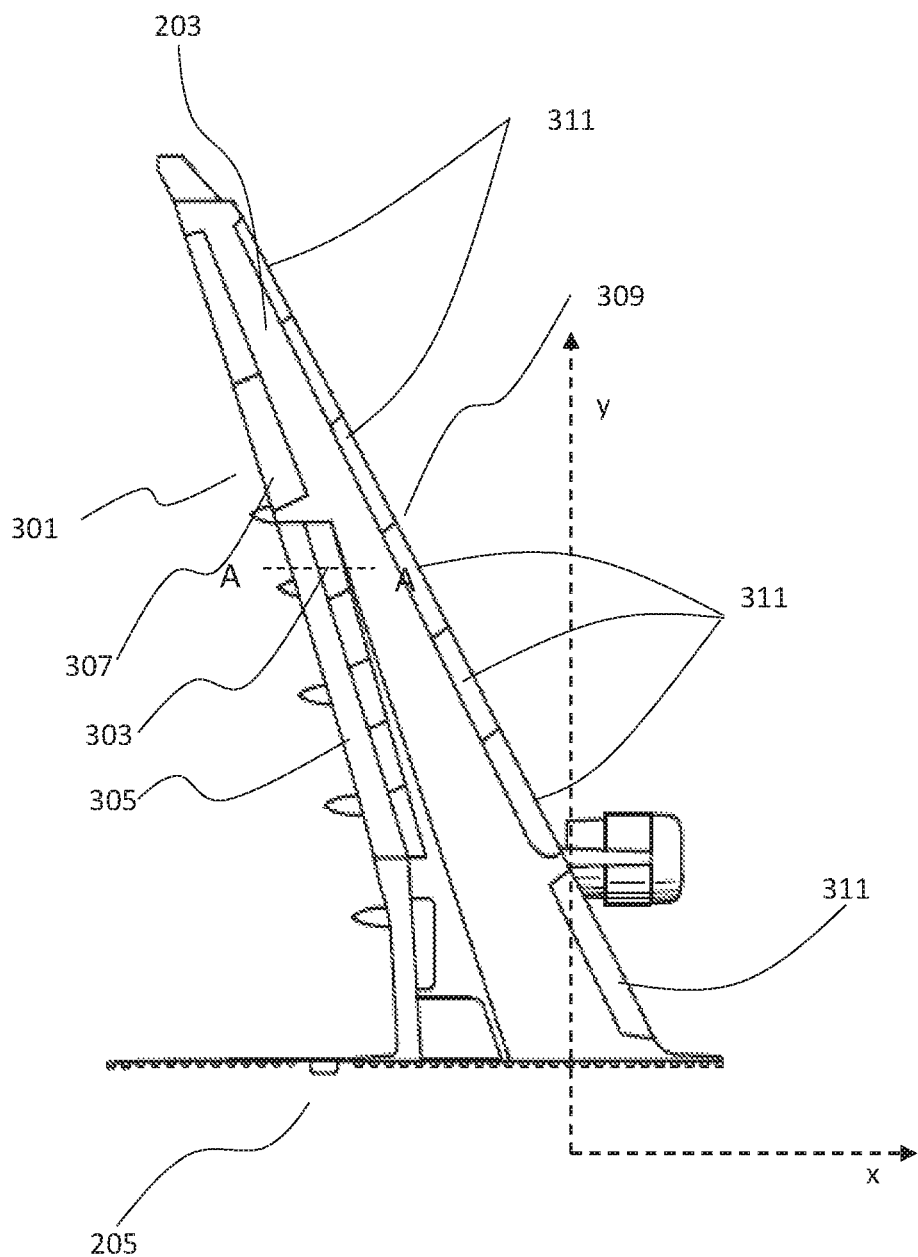
FIG. 3 is a schematic plan view of a wing of the aircraft of FIG. 2 according to the present invention.

With reference to FIG. 3, various types of moveable structures are provided either side of the fuselage 205 on the wing 203. In the trailing edge region 301 of the wing 203 the moveable structures are often referred to as spoilers 303, flaps 305, and ailerons 307, of which a plurality may be used. In the leading-edge region 309 of the wing 203 the moveable structures are often referred to as slats 311. All of these types of moveable structures may be actuated using the same elements as described in FIG. 1A.

Figure 4:
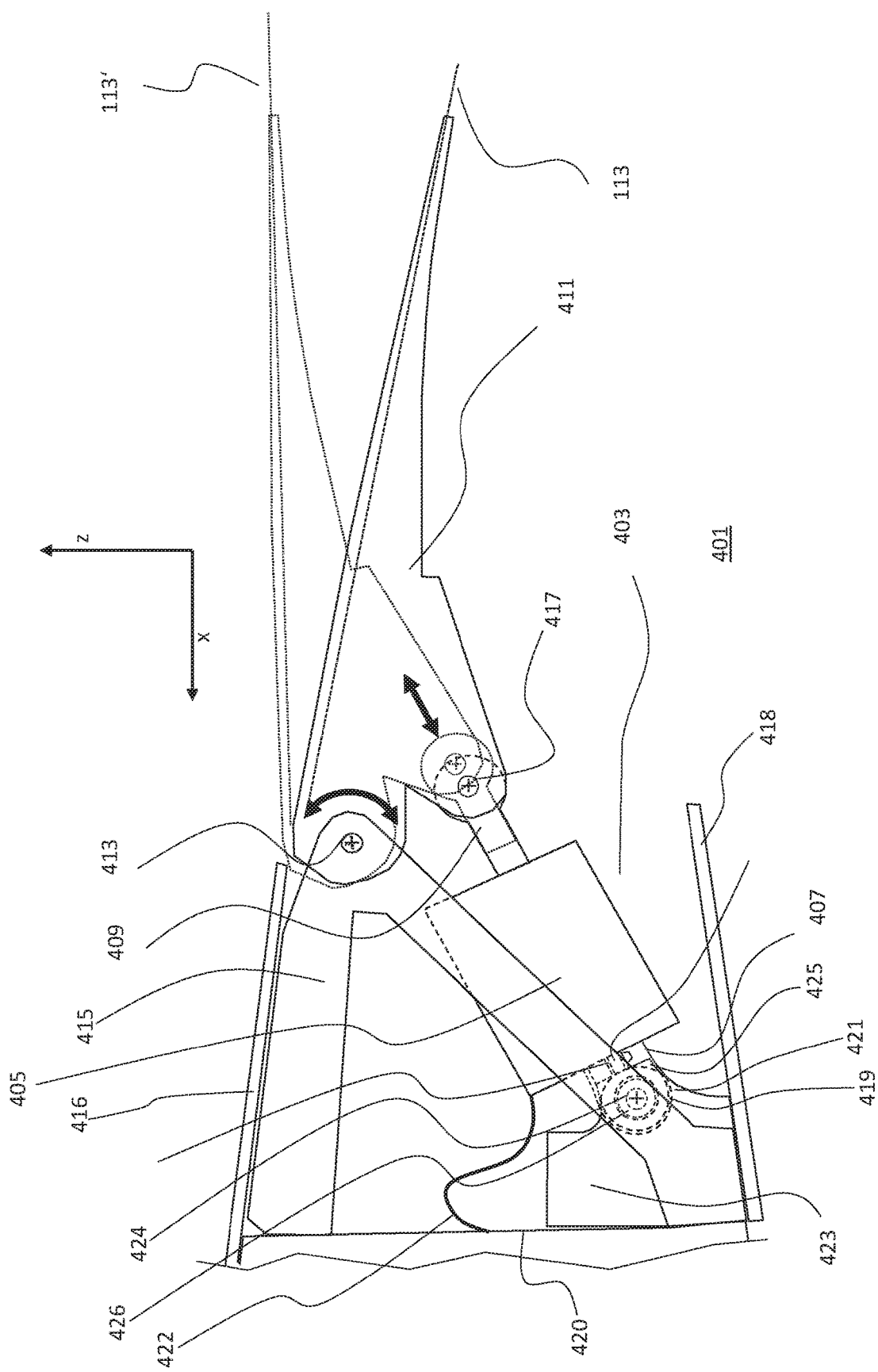
FIG. 4 is a schematic side view through section A-A of FIG. 3, showing a spoiler actuator assembly according to the present invention.

With reference to FIG. 4, a spoiler actuator assembly 401 is shown. An actuator 403 comprises a main body 405, a connection body 407 and a push rod 409. A spoiler 411 is hingedly connected at a hinge position 413 with a hinge rib 415. The hinge rib is fixedly attached to an upper and lower wing cover 416, 418 and a rear spar 420. The push rod 409 is provided by the actuator 403 and is hingedly connected to the spoiler 411 with a lug, pin and clevis at a further hinge position 417 at the aftmost end (in the negative x direction) of the actuator 403.

The main body 405 of the actuator 403 contains the hydraulic power and control elements of the actuator 403, which provide sufficient hydraulic force to extend and retract the push rod 409 into, and out of, the actuator main body 405. The connection body 407 (also known as a tailstock) is integrally formed with the main body 405, although alternatively, the connection body 407 may be a sub-component of the actuator 403 that is fixedly attachable to the main body 405.

Figure 5A:
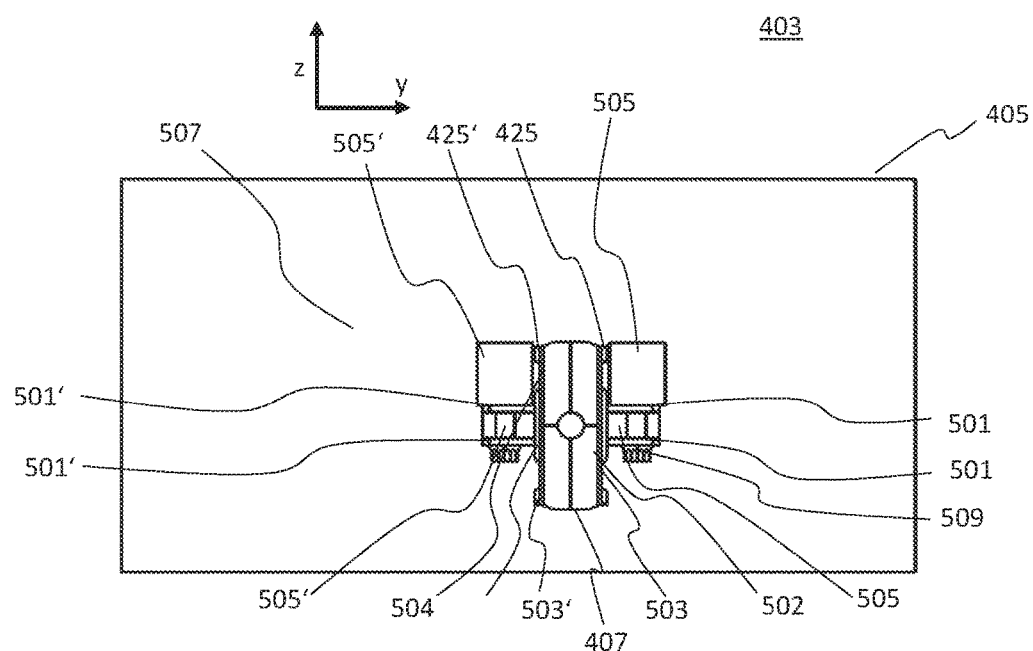
FIG. 5A is a schematic end view of the actuator and holding device of FIG. 4.
Figure 5B:
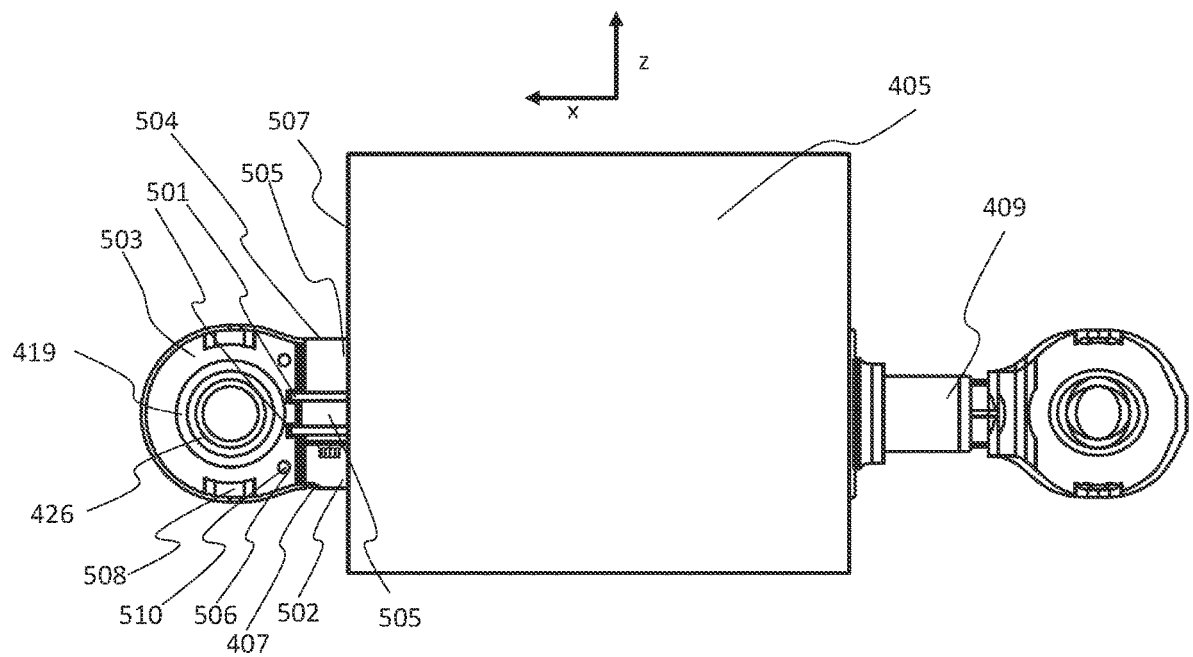
FIG. 5B is a schematic side view of the actuator and holding device of FIG. 4.

The connection body 407 is substantially rectangular in cross-section and has opposing upper, lower, inner and outer sides (see FIGS. 5A and 5B). It should, however, be appreciated that the connection body 407 may alternatively be of any other suitable cross-section, i.e., circular, depending on the chosen manufacturing process and load requirements of the actuator 403.

The innermost and outermost sides each lie substantially on a pair of planes offset parallel from the aircraft x-z plane. The upper and lower sides lie substantially orthogonal to the innermost and outermost sides. The connection body 407 forms a straight sided lug 419 at the actuators foremost end (in the x direction). The lug 419 is configured to hingedly attach within a corresponding clevis 421 provided by the actuator support body 423 using a pin 424. A spherical bearing 426 is used between the pin 424 and the lug 419 of the connection body 407, to account for rotation of up to +/−6 degrees of the actuator 403 about a longitudinal axis of the push rod 409 when in use.

Extension and retraction of the push rod 409 of the actuator 403 in the linear direction shown is reacted by the actuator support body 423, which causes the spoiler 411 to deploy and retract by hinging anti-clockwise and clockwise, respectively as shown. Similarly, the spoiler 411 retracts when the push rod 409 is retracted into the main body 405. The connection body 407 and the main body 405 transfers actuation, inertial and aerodynamic induced loads between the spoiler 411 and the actuator support body 423 during extension and retraction, however, in an alternative embodiment, it may be that the connection body 407 is configured to transfer the majority of such loads.

Figure 1B:
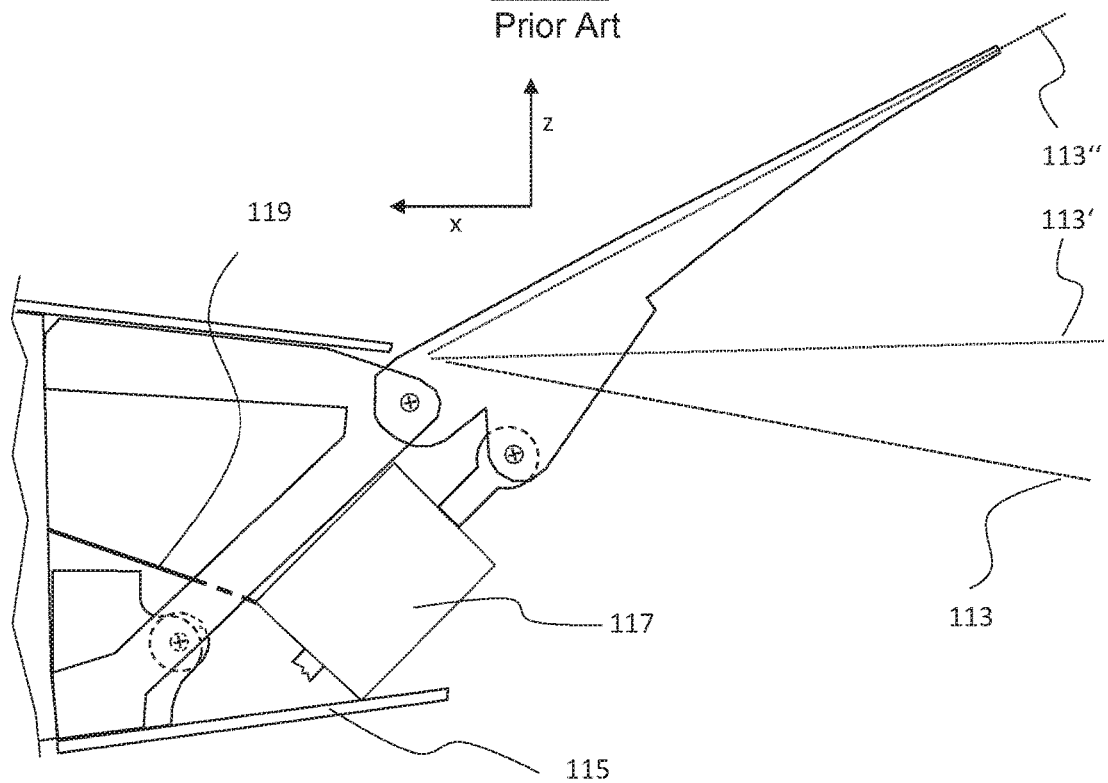

The actuator assembly 401 further comprises a pair of holding devices 425, 425' fixedly attached to the main body 405 of the actuator 403 and hingedly connected to the actuator support bracket 423. Such an arrangement may, in addition, be used at the push rod 409 end with the spoiler 411. In the event of failure of the connection body 407 at either location 121, 123 as previously described (with reference to FIG. 1), then one or both of the holding devices 425, 425' prevents movement of the actuator 403 aftwards (in the negative x direction) or forwards (in the positive x direction) by bearing against the pin 424. The function of the holding devices 425, 425' is to transfer the inertial and aerodynamic loads from the spoiler 411 and the actuator 403 to the actuator bracket 423 and to prevent the actuator 403 and spoiler 411 from moving outside of the envelope of normal working positions 113, 113' relative to the actuator support body 423.

In the present embodiment, it is preferable to use a pair holding devices 425 and 425'; one on either side of the connection body 407. This is advantageous in that it is a symmetric design that ensures an evenly balanced load distribution at the clevis 421 and main body 405 in the event of failure of the connection body 407. Furthermore, fail-safe redundancy for such a design is doubled, which may be required for certification of the design. It should be also appreciated that one or more of the holding devices may be used, depending on the required load transfer between the actuator 403 and the actuator support bracket 423 and the particular requirements for the desired application.

This is advantageous as previously mentioned as it reduces potential damage to the surrounding structure such as the hinge rib 415, rear spar 420, lower cover 418, or actuator support bracket 423, as well as avoiding detachment of, or other damage to, the systems elements 422 connected to the actuator 403. Furthermore, it prevents the spoiler 411 from further deploying to an over-extended position 113", shown in FIG. 1B, due to low aerodynamic pressure acting on it during flight. This potentially avoids unwanted effects on the flight handling characteristics induced on the aircraft 201 by an otherwise over-rotated spoiler 411. It also potentially avoids the associated drag that would result.

With reference to FIGS. 5A and 5B, each holding device 425, 425' has a substantially unitary body formed from aviation grade titanium alloy plate. Titanium alloy is advantageous in that its mechanical properties make it suited for high load applications, while, at the same time, being relative lighter than other engineering materials. Furthermore, it is corrosion resistant, which is particularly advantageous in the case of the actuator assembly 401 according to the present invention, which is exposed to environmental factors such as corrosive elements such as salt, water and hydraulic fluid. Alternatively, each holding device may be machined from high strength aviation grade corrosion resistant stainless steel or any suitable known material.

Each holding device 425, 425' substantially conforms to, and is placed adjacent to, the outermost 502 and innermost sides 504 of the connection body 407. The body of each holding device 425, 425' is substantially rectangular in cross-section with a thickness between 2 mm and 4 mm and extends between a pair of attachment flanges 501, 501' and a lug 503, 503'. The relatively low thickness and conformity to the outer shape of the adjacent connection member 407 permits the holding devices 425, 425' to fit within the clevis 421 of the actuator support body 423 adjacent to where the connection body 407 hingedly connects.

This is particularly advantageous in that it is allows for a more evenly balanced load distribution on the holding devices 425 and 425' at the clevis 421 in the event of failure of the connection body 407. Furthermore, such a design, where the holding devices are retained between the clevis 421 and the adjacent lug 419 of the connection body 407, avoid as much as possible the negative possibility of the holding devices 425, 425' moving away from one another or the clevis 421, which would result in out of plane loads being transferred through the holding devices. It should be appreciated, however, that the holding devices may be located outside the clevis 421 and may be designed to withstand high amounts of out of plane loading. Furthermore, in any case, the body of each holding device 425, 425' may conform to any suitable cross-section of the connection body 407, e.g., circular.

In the present embodiment, each pair of attachment flanges 501, 501' extend substantially perpendicular spanwise from the body of the respective holding device 425, 425' adjacent to an aft edge of the respective lug 503, 503'. The attachment flanges 501, 501' are configured to substantially conform to, and to be placed adjacent to corresponding landings 505, 505' integrally formed at a forward face 507 of the main body 405 of the actuator 403. A pair of concentric through holes are formed by each pair of attachment flanges 501, 501', wherein each pair of holes provided by each respective holding device is further configured to receive a shear fastener 509 that fixedly attaches each holding device 425, 425' to the corresponding landings 505, 505' in a lap joint arrangement. It should be appreciated that more than one fastener may be used for each holding device.

The use of a lap type joint between each holding device 425, 425' and the actuator main body 405 is advantageous in that the fasteners are configured to be installed from a lower side of the actuator assembly 401. This is advantageous because access to the actuator assembly is normally from a lower side when the aircraft is on the ground. Hence the holding devices 425, 425' can each be easily removed without needed to remove the spoiler 411 to gain access to the fasteners.

Furthermore, a pair of loose tolerance receiving 506 holes are defined by the body of each holding device 425, 425'. Each pair of holes 506 is configured to receive the corresponding pair of spigots 510 provided by the connection body 407. The spigots 510 and holes 506 assist with installation and removal of holding devices 425, 425' by keeping them in position when the shear fasteners are removed or are being installed. The placement of the spigot 510 adjacent to the aft edge of the lug 419 is furthermore advantageous in that it permits the body of each holding device 425, 425' to be elastically bent by a technician such that the spigot 510 can fully disengage from its corresponding hole 506, thus facilitating its removal, when needed. The spigot 510 and corresponding hole 506 is further advantageous in that it may provide an alternate or additional load transfer path between the main body 405 and actuator support bracket 423 in the event of a structural failure of the connection body 407. It should be appreciated by those skilled in the art that one or more spigots may be used for each holding device.

Each holding device 425, 425' further comprises a pair of diametrically opposing anti-rotation knuckles 508.

Figure 6:
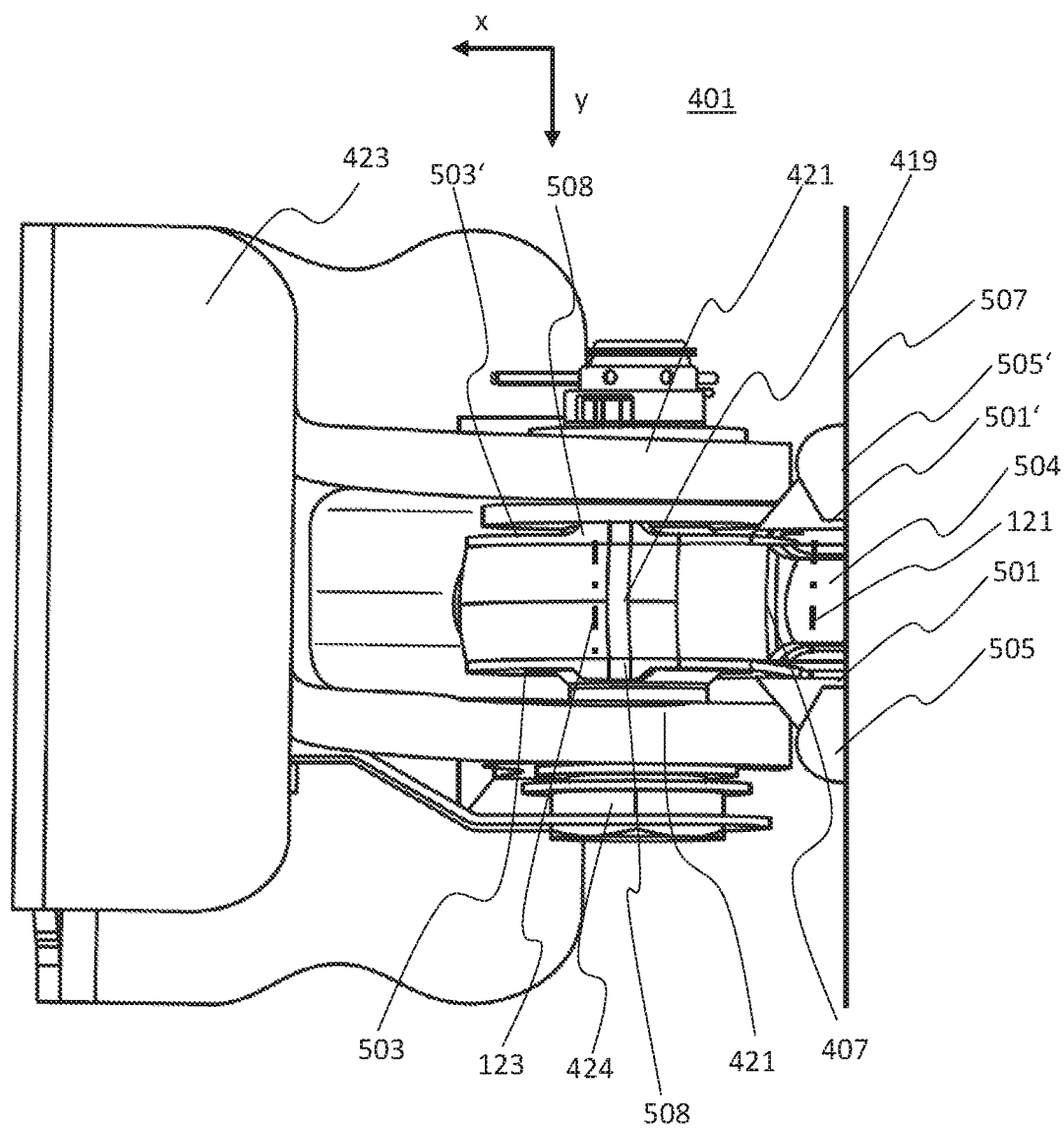
FIG. 6 is a close-up schematic plan view of the actuator assembly of FIG. 4.

With reference to FIG. 6, each lug 503, 503' is configured to be hingedly mounted within the corresponding clevis 421 provided by the actuator support body 423 using the same pin 424. The lug 503, 503' of each holding device 425, 425' may have an inner diameter offset (also known as a clearance fit) of between 0.5 mm and 3 mm from adjacent attachment elements. In the present embodiment, the adjacent attachment element is the spherical bearing 426 and an offset of 3 mm is used. This ensures that neither holding device 425, 425' is contacted by the spherical bearing 426 during normal operation, which may cause damage. This also ensures that no load (or very low amounts thereof) is transferred through the holding device during normal operation, thus improving the fatigue life of the holding device 425, 425'. It should be appreciated that an offset is similarly advantageous in assemblies where a spherical bearing 426 is not provided, e.g., where the adjacent attachment element is the shank of the pin 424, in which case an offset of 0.5 mm with the pin 424 would be sufficient.

Where in the foregoing description, integers or elements are mentioned which have known, obvious or foreseeable equivalents; then such equivalents are herein incorporated as if individually set forth. For example, the actuator assembly described with reference to the drawings may equally be used for moveable elements of an aircraft vertical tail pane such as a rudder actuator assembly or for moveable elements of a horizontal tail plane such as an elevator actuator assembly. As a further example, one or more holding devices may be, in addition or alternatively, installed in an actuator assembly at a push rod end of an actuator, where it hingedly connects to a moveable device. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft actuator assembly, comprising:
   an actuator comprising a main body and a connection body;
   a holding device comprising a body that extends between an attachment flange and a lug, wherein the attachment flange is configured to be fixedly attached to a corresponding landing provided by the main body of the actuator and the lug is configured to be hingedly connected to an actuator support body;
   the connection body being provided with a further lug configured to hingedly connect the actuator to the actuator support body;
   wherein the holding device is configured to prevent movement of the actuator from a normal working position relative to the actuator support body in an event of structural failure of the connection body; and
   wherein the attachment flange and corresponding landing form a lap joint when fixedly attached to one another by a shear type fastener.

2. The aircraft actuator assembly according to claim 1, wherein the actuator support body forms a clevis configured to receive the lug of the holding device and the further lug of the connection body.

3. The aircraft actuator assembly according to claim 1, comprising more than one holding device.

4. The aircraft actuator assembly according to claim 3, comprising a pair of holding devices, each holding device positioned at opposing sides of the connection body.

5. A kit of parts comprising an actuator and the holding device according to claim 1.

6. An aircraft actuator comprising:
   a main body, and
   a connection body,
   wherein the main body is provided with a landing configured to receive an attachment flange of a holding device and the connection body is provided with a lug configured to hingedly connect the actuator to an actuator support body;
   wherein the holding device is configured to prevent movement of the actuator from a normal working position relative to the actuator support body in an event of structural failure of the connection body; and
   wherein the attachment flange and corresponding landing form a lap joint when fixedly attached to one another by a shear type fastener.

7. The aircraft actuator according to claim 6, comprising more than one landing, wherein each landing is configured to receive a corresponding attachment flange of a holding device.

8. The aircraft actuator according to claim 6, wherein the connection body further comprises a spigot configured to engage a corresponding receiving hole formed by a body of the holding device.

9. A holding device for an aircraft actuator, comprising:
   a body that extends between a lug, configured to hingedly connect the holding device to an actuator support body, and an attachment flange configured to fixedly attach the holding device to a landing provided by a main body of an actuator;
   wherein the holding device is configured to prevent movement of the actuator from a normal working position relative to the actuator support body in an event of structural failure of a connection body of the actuator; and
   wherein the attachment flange and corresponding landing form a lap joint when fixedly attached to one another by a shear type fastener.

10. The holding device according to claim 9, wherein the lug is configured to be received within a clevis formed by an actuator support body.

11. The holding device according to claim 9, comprising a unitary body formed from aviation grade titanium alloy.

12. The holding device according to claim 9, wherein the attachment flange extends substantially perpendicular from the body of the holding device.

13. The holding device according to claim 9, wherein the body further comprises a receiving hole configured to receive a corresponding spigot formed by a connection body of an actuator.

14. The holding device according to claim 9, wherein the lug is configured to have an inner diameter offset of between 0.5 mm and 3 mm from an adjacent attachment element.

* * * * *